Nov. 26, 1968  T. J. DALEY ETAL  3,413,552
WATTHOUR METERS HAVING DUST-PROOF CASINGS
Filed Aug. 12, 1963  2 Sheets-Sheet 1

WITNESSES
Theodore F. Wrobel
James F. Young

INVENTORS
Frank G. Kuhn, Thomas J. Daley
and Frederick E. Mindt
BY C. L. Freedman
ATTORNEY United States Patent Office 3,413,552
Patented Nov. 26, 1968

3,413,552
WATTHOUR METERS HAVING
DUST-PROOF CASINGS
Thomas J. Daley, Frederick E. Mindt, and Frank G.
Kuhn, Raleigh, N.C., assignors to Westinghouse Electric Corporation, East Pittsburgh, Pa., a corporation of Pennsylvania
Filed Aug. 12, 1963, Ser. No. 301,499
8 Claims. (Cl. 324—156)

ABSTRACT OF THE DISCLOSURE

A watthour meter casing base is provided with three vertically-spaced filters to permit breathing and drainage while barring dust from entering the casing.

---

This invention relates to electrical measuring devices and it has particular relation to watthour meters suitable for outdoor mounting.

Electrical measuring devices, such as watthour meters, which are designed for outdoor mounting generally employ a container or casing within which the watthour meter is located. Openings conventionally are provided in the container to establish breathing or air communication between the interior and exterior of the container.

In the copending patent application of Merrion D. Gill, Ser. No. 211,279, filed July 20, 1962, and now Patent No. 3,337,802, assigned to the same assignee, it has been proposed that a meter be provided with a container which is substantially sealed against the transmission of deleterious material such as dust and insects between the exterior and interior of the container. The container is provided with a moisture-discharging device which is located at the lowest level of the container. Although the device provides a path for discharging moisture from the interior to the exterior of the container it is designed to provide an effective barrier against the transmission of the aforesaid deleterious material.

In accordance with the invention a pair of breathing devices are provided in addition to the abovementioned moisture-discharging device. These breathing devices are placed respectively adjacent the top and bottom of the container in positions such that no barrier restricts the flow of air between them. They are designed to bar transmission of deleterious material. Preferably they are constructed of ceramic filter material which is accessible for replacement exteriorly of the container and which maintains the aforesaid sealing of the container.

It is therefore an object of the invention to provide an electroresponsive measuring unit which includes a container for a watthour meter provided with an improved sealing system.

It is also an object of the invention to provide a meter assembly which includes an improved vented container for a meter wherein the container effectively seals its contents against the entry of deleterious material.

It is a further object of the invention to provide a meter assembly which includes an improved vented container for a meter wherein the container has moisture-discharging provision and wherein the container effectively seals its contents against the entry of deleterious material.

Other objects of the invention will be apparent from the following description taken in conjunction with the accompanying drawing in which.

Figure 1:
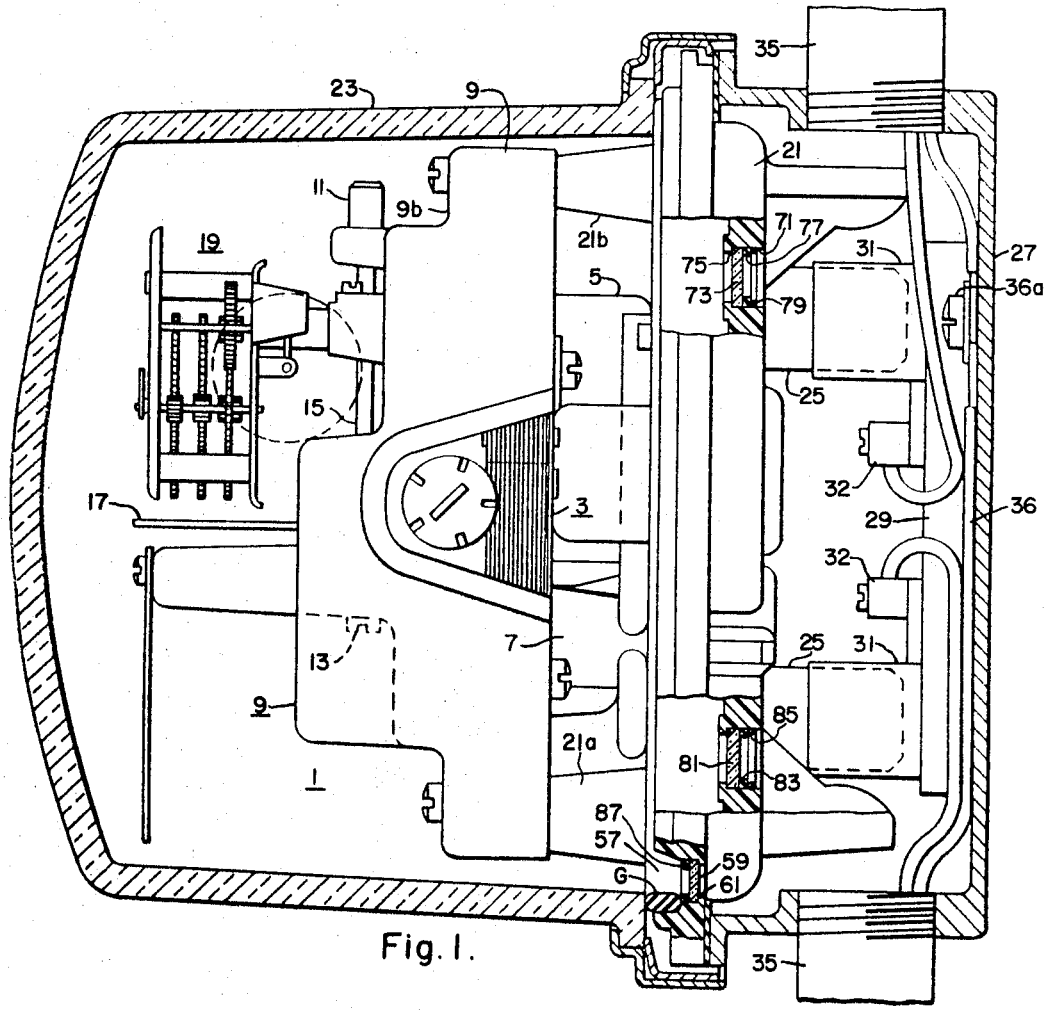
FIGURE 1 is a view in elevation with parts broken away of a watthour meter assembly embodying the invention.

Referring to FIG. 1 of the drawing a watthour meter 1 is illustrated which includes an electromagnet 3. The electromagnet has voltage winding means 5 and current winding means 7 which when energized produce a shifting magnetic field.

The electromagnet 3 is mounted in a frame 9 which is constructed of a non-magnetic electroconductive material such as an aluminum die casting alloy. The frame has a rim portion 9a and a front portion 9b which extends substantially over the front of the electromagnet 3.

Other components of the watthour meter are supported by the frame 9. Thus, the frame has bearing units 11 and 13 which rotatably receive a shaft 15 to mount the shaft for rotation relative to the electromagnet 3. This shaft supports an electroconductive disc or armature 17 which has a portion located in the shifting magnetic field provided by the electromagnet 3. Conventional damping magnets (not shown) are secured to the frame 9 to provide a magnetic field through which a portion of the armature 17 rotates. As well understood in the art when the electromagnet 3 is suitably energized the armature 17 rotates at a rate dependent on the electrical energy supplied by an electrical circuit from which the electromagnet 3 is energized. The rotation of the shaft 15 is counted or registered by means of a conventional register 19.

The watthour meter 1 is mounted on a suitable base 21 which conveniently may be constructed of an insulating material such as a phenolic resin. The watthour meter 1 is located within a container or casing formed by the base 21 and a cup-shaped glass cover 23 which is detachably secured to the base 21 in any conventional manner. A gasket G is interposed between the glass cover and the base. The base has integral abutments 21a and 21b projecting therefrom to provide supporting surfaces for the electromagnet 3.

In order to couple the electromagnet windings to an external electrical circuit terminal means are provided which pass through the base 21. In the embodiment of FIG. 1 the terminal means takes the form of electroconductive contact blades 25 which have portions extending into the casing for connection to the winding means and portions accessible externally of the casing.

Connections to the contact blades 25 from an external circuit are established by a conventional socket which includes a cup-shaped enclosure 27 having its open end closed by the base 21. The enclosure 27 carries insulating blocks 29 on which contact jaws 31 are mounted. These contact jaws are positioned to receive detachably the contact blades 25 when the watthour meter 1 and its casing are mevode to the right as viewed in FIG. 1 into the mounted position therein illustrated.

Each of the contact jaws 31 has a suitable terminal 32 connected thereto for receiving the conductor of an external circuit with which the watthour meter is to be associated. The conductors enter and leave the sockets through conduit 35 as shown in FIG. 1.

It is common practice to employ a ground conductor 36 which is attached to a ground terminal 36a in the socket. In a three-wire system the ground conductor is not connected to the meter. It may be located about one and one-half inches from the rear of the meter base.

The structure of FIG. 1, as thus far described, is conventional in the art and is described in greater detail in a publication entitled, "Descriptive Bulletin 42–101," dated May 1960, and published by the Westinghouse Electric Corporation, Raleigh Plant, Raleigh, N.C.

The container formed by the base 21 and the cover 23 is sealed against entry of deleterious material. The gasket G is preferably of a resilient material, such as an elastomer, for the purpose of establishing a seal between the base and the cover. It will be understood that the base may be detachably secured to the cover in a conventional manner.

In order to prevent the entry of deleterious material through spaces present between the contact blades and the base 21 the contact blades may be molded into the material of the base to provide a gap-free construction or caulking cement may be employed to fill any spaces left between the contact blades and the base. Preferably, the contact blades are substantially sealed to the base 21 in the manner shown in FIG. 2.

Figure 2:
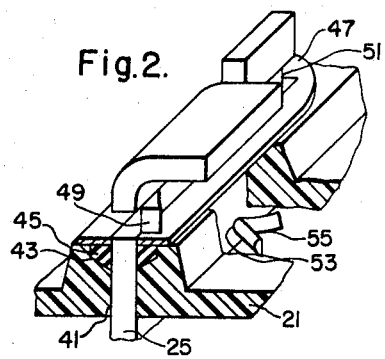
FIG. 2 is a detail view in perspective showing a suitable mounting for contact blades employed in the assembly of FIG. 1.
Figure 3:
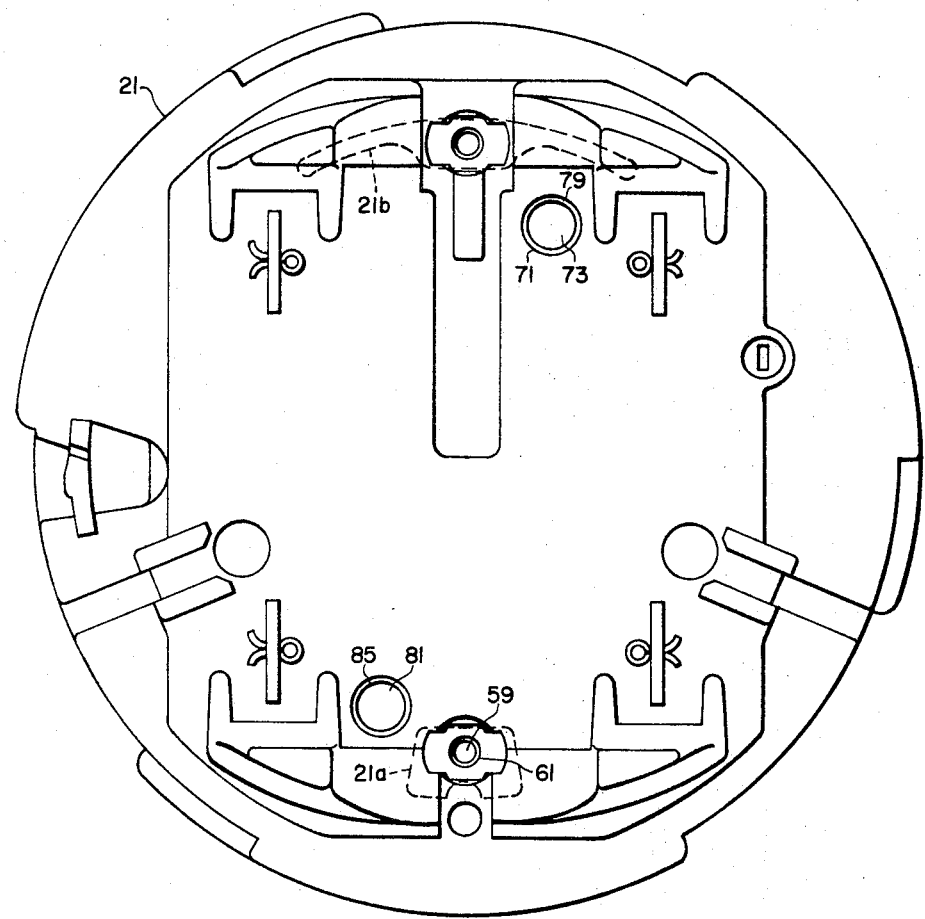
FIG. 3 is a view in rear elevation of the base employed in the meter assembly of FIG. 1.

As shown in FIG. 2, the base 21 is provided with a slot 41 for snugly receiving each of the contact blades. The base is provided with a trough 43 completely surrounding the upper end of the contact blade, as viewed in FIG. 2. The trough is filled with a gasket 45 which is constructed of a resilient material such as rubber, preferably chlorinated butyl. In its relaxed condition the gasket extends slightly above the base 21 as viewed in FIG. 2. A washer 47 has a slot for snugly receiving the contact blade 41. The washer may be constructed of a suitable material, such as stainless steel. It will be noted that fingers 49 and 51 are formed by slitting the contact blade and are bent to overlie portions of the washer 47. These fingers limit motion of the washer in an upward direction, as viewed in FIG. 2, relative to the contact blade.

The gasket 45 is held compressed between the washer 47 and the base 21 in any suitable manner. In the embodiment of FIG. 2 the contact blade is provided with a hole 53 for reception of a cotter pin 55. When the contact blade 25 is forced downwardly, as viewed in FIG. 2, to compress the gasket 45 the hole 53 extends just far enough beyond the base 21 to receive the cotter pin 55. Consequently, after insertion of the cotter pin and release of the contact blade 25 the gasket 45 remains under compression to effect a substantial seal between the contact blade and the base.

In order to permit moisture discharge from the container a vent 57 is provided which extends through the base 21 between the interior of the container and the interior of the associated socket. The vent is located adjacent the lowest point of the container in order to facilitate drainage of water away from the interior of the container. It has been proposed that this vent be provided with a screen. For example, a screen constructed of aluminum wire having a diameter of 0.01 inch has been employed wherein the screen has a mesh represented by 40 wires per inch in one direction and 36 wires per inch in a direction transverse to the first direction. Such a screen does not prevent the entry into the container of dust and insects.

The vent 57 is sealed by a material 59 which is impermeable to deleterious material such as dust and insects normally encountered by the watthour meter assembly, but which is permeable to air and water. Preferably, the material is immune to chemicals or reagents which may be present adjacent thereto. In a preferred embodiment of the invention, the material acts as a wick to conduct water across the base 21 by capillary action or by transfer of the water to a region of lower partial pressure defined by the socket and associated conduit.

Asbestos has been employed successfully as the material, however, asbestos is subject to the disadvantage that it is a source of lint.

In a preferred embodiment of the invention, a porous ceramic is employed as the material 59. In particular, silica has been found to possess excellent properties when employed as the material 59. Porous silica filters are available on the market and are employed in chemical plants for filtering purposes. It is conventional to classify such silica filters by the diameter of the pores or filtering passages which it contains. For example, a 20 micron silica filter has pores or passages which are too small to pass dust having a diameter greater than 20 microns. Filters which do not exceed a rating of 120 microns have proved to be satisfactory for most applications, and a 20 micron silica filter has been tested with good results.

If desired, the material 59 may be cemented or otherwise secured in the vent 57.

Preferably, the material 59 is in the form of a cylindrical disc of silica which is snugly received within a cup-shaped opening in the base 21 which opens into the interior of the container. The end wall of the cup-shaped opening is provided with a hole 61 which is smaller in diameter than the diameter of the disc 59 and which opens into the socket.

By inspection of FIG. 1, it will be noted that a portion of the gasket G overlies the disc 59. The gasket suffices to retain the disc 59 in its mounted position as shown in FIG. 1.

Tests have demonstrated that the disc 59 is extremely effective in sealing the container against dust and insects. At the same time it provides a positive path which provides for discharge of water from the container.

Except for the base 21 the components of the drawing which thus far have been specifically described are similar to components shown in the aforesaid Gill patent application. We have found that the disc 59 affords excellent drainage for moisture.

As a result of our studies we have found it possible to provide a container having materially improved breathing. In accordance with the invention a vent 71 is located in the base 21 adjacent the upper end of the base. This vent is so positioned that it is clear of barriers formed by components of the meter unit which might impede the flow of air through the vent. Preferably the vent 71 has a cross sectional area larger than that of the vent 57. The vent 71 is closed by a cylindrical disc similar to the disc 59 but larger in diameter. The disc 73 may be cemented or otherwise secured in the vent 71.

Preferably the disc 73 is snugly received within a cup-shaped opening in the base 21 which opens into the socket enclosure 27. The end wall of the cup-shaped opening is provided with a hole 75 which is smaller in diameter than the diameter of the disc 73 and which opens into the container.

In a preferred embodiment of the invention a ring-shaped gasket 77 is snugly received in the vent 71 to engage the right hand face of the disc 73 as viewed in FIGURE 1. This gasket may be constructed of a resilient synthetic rubber, such as chlorinated butyl. A spring retaining ring 79 is compressed within the vent 71 and slightly compresses the gasket 77 to force it into firm engagement with the wall of the vent and with the adjacent face of the disc 73 to seal the juncture between the disc and the base 21.

Preferably an additional disc 81 is employed which is similar to the disc 73 in construction. The disc 81 is mounted in the base 21 in a manner similar to the mounting of the disc 73. The disc 81 is located adjacent the lower part of the base but is so positioned that no component of the metering unit acts as a barrier in the path of air flowing through the disc 81. A gasket 83 and a spring retainer ring 85 are associated with the disc 81 and the base 21 in the same manner discussed for the association of the gasket 77 and the ring 79 with the disc 73 and the base 21.

Preferably the discs 73 and 81 are larger in diameter than the disc 59. For example, the disc 59 may have a diameter of the order of 0.300 inch whereas the discs 73 and 81 have diameters of the order of 0.438 inch.

A resilient ring gasket 87 may be associated with the disc 59 in the same manner by which the gasket 77 is associated with the disc 73. Although a spring retainer ring may be employed for retaining the gasket 87 in slightly compressed condition it has been found that such a ring is not necessary.

It will be noted that the discs 73 and 81 may be replaced without removing the base 21 from the cover 23. This is desirable for the reason that the container normally is in substantially sealed condition. Any major opening of the container and any handling of the components within the container should be avoided.

As previously pointed out the primary function of the disc 59 is to drain moisture from the container. It is constructed and located primarily for this function. The primary function of discs 73 and 81 is to provide adequate breathing for the container. Consequently, these discs are constructed and positioned to assure adequate breathing. As a secondary function the disc 59 also assists in providing breathing for the container.

The provision of a plurality of vents spaced vertically from each other provides a draft or "chimney effect" which assures good circulation of air or breathing for the container.

Although the invention has been described with reference to certain specific embodiments thereof, numerous modifications falling within the spirit and scope of the invention are possible.

We claim as our invention:

1. In an electrical measuring device, an induction electroresponsive measuring unit, a substantially sealed container for said measuring unit, moisture-discharging means for the container, first and second breathing means for the container, said moisture-discharging means and said breathing means each comprising a particle filter having capillary passages for inhibiting entry of particles from the exterior of said container through the moisture-discharging device and the breathing means into the container, said moisture-discharging device being located at the lowest level at which moisture can collect in said container, said first breathing means being spaced upwardly from the moisture discharging means and downwardly from the second breathing means, each of the breathing means filters having an inner end communicating freely with the interior of the container and an outer end communicating freely with the exterior of the container.

2. In an electrical measuring device, an induction electroresponsive measuring unit, a substantially sealed container for said measuring unit, moisture-discharging means for the container, first and second breathing means for the container, said moisture-discharging means and said breathing means each comprising a porous silica particle filter having capillary passages for inhibiting entry of particles from the exterior of said container through the moisture-discharging device and the breathing means into the container, said moisture-discharging device being located at the lowest level at which moisture can collect in said container, said first breathing means being spaced upwardly from the moisture discharging means and downwardly from the second breathing means, each of the breathing means filters having an inner end communicating freely with the interior of the container and an outer end communicating freely with the exterior of the container.

3. In an electrical measuring device, an induction electroresponsive measuring unit, a substantially sealed container for said measuring unit, moisture-discharging means for the container, first and second breathing means for the container, said moisture-discharging means and said breathing means each comprising a porous silica particle filter having capillary passages with transverse dimensions of said passages less than 120 microns for inhibiting entry of particles from the exterior of said container through the moisture-discharging device and the breathing means into the container, said moisture-discharging device being located at the lowest level at which moisture can collect in said container, said first breathing means being spaced upwardly from the moisture discharging means and downwardly from the second breathing means, each of the breathing means filters having an inner end communicating freely with the interior of the container and an outer end communicating freely with the exterior of the container.

4. In an electrical measuring device, an induction electroresponsive measuring unit, a substantially sealed container for said measuring unit, moisture-discharging means for the container, first and second breathing means for the container, said moisture-discharging means and said breathing means each comprising a particle filter having capillary passages for inhibiting entry of particles from the exterior of said container through the moisture-discharging device and the breathing means into the container, said moisture-discharging device being located at the lowest level at which moisture can collect in said container, said first breathing means being spaced upwardly from the moisture discharging means and downwardly from the second breathing means, each of said breathing means having a breathing area substantially larger than the moisture-discharging area of the moisture-discharging device, each of the breathing means filters having an inner end communicating freely with the interior of the container and an outer end communicating freely with the exterior of the container.

5. In an electrical measuring device, an induction electroresponsive measuring unit, a substantially sealed container for said measuring unit, moisture-discharging means for the container, first and second breathing means for the container, said moisture-discharging means and said breathing means each comprising a particle filter having capillary passages for inhibiting entry of particles from the exterior of said container through the moisture-discharging device and the breathing means into the container, said moisture-discharging device being located at the lowest level at which moisture can collect in said container, said first breathing means being spaced upwardly from the moisture discharging means and downwardly from the second breathing means, said breathing means being removable and replaceable exteriorly of said container, each of the breathing means filters having an inner end communicating freely with the interior of the container and an outer end communicating freely with the exterior of the container.

6. In an electrical measuring device, an induction electroresponsive measuring unit including display means for depicting the value of the quantity measured by the measuring unit, a substantially sealed container for said measuring unit, terminal means extending through a wall of the container, gasket means establishing a seal between the terminal means and the wall, a socket for receiving said terminal means, said socket defining with a wall of said container a chamber for said terminal means, the wall of said container having vertically spaced openings therethrough for establishing communication between the interior of the container and said chamber, a first one of the openings being at the lowest level at which moisture can accumulate in the container, and moisture-transmitting, particle-blocking, capillary-passage material disposed in said openings for preventing passage therethrough of particles of matter, a second one of said openings being spaced vertically above the first opening and a third one of said openings being spaced vertically above the second opening, said second and third openings each having a larger cross-section adjacent to the exterior of said chamber than adjacent to the interior of said container, said material being located snugly in the larger cross-section of each of said second and third openings and being removable from the wall in a direction away from the interior of the container, and a separate ring-shaped gasket compressed in each of said second and third openings for sealing the junction between the associated material and the wall.

7. In an electrical measuring device, an induction electroresponsive measuring unit, a substantially sealed container for said measuring unit, first and second breathing means for the container, said breathing means each comprising a porous silica particle filter having capillary passages with transverse dimensions of said passages less than 120 microns for inhibiting entry of particles from the exterior of said container through the breathing means into the container, said first breathing means being spaced downwardly from the second breathing means, each of the breathing means filters having an inner end communicating freely with the interior of the container and an outer end communicating freely with the exterior of the container.

8. A device as claimed in claim 7 wherein said container comprises a cup-shaped cover having its open end closed by a base member, said breathing means each comprising an opening through said base member substantially closed by the associated silica particle filter, and electroconductive terminals extending through the base member for connecting the measuring unit to an external circuit.

References Cited
UNITED STATES PATENTS

| | | | |
|---|---|---|---|
| 1,351,294 | 8/1920 | Levin | 310—88 |
| 2,323,146 | 6/1943 | Manney | 310—88 |
| 2,470,050 | 5/1949 | Petterson | 310—88 |
| 2,476,909 | 7/1949 | Ratz | 324—156 |
| 2,790,951 | 4/1957 | Holtz | 324—156 |
| 2,970,265 | 1/1961 | Lipscomb | 324—137 X |

RUDOLPH V. ROLINEC, *Primary Examiner.*

P. A. URIBE, *Assistant Examiner.*